United States Patent
Harriman et al.

(10) Patent No.: US 12,137,152 B2
(45) Date of Patent: Nov. 5, 2024

(54) METHOD AND SYSTEM FOR PROVIDING PROXY SERVICE IN AN INDUSTRIAL SYSTEM

(71) Applicant: Schneider Electric Industries SAS, Rueil Malmaison (FR)

(72) Inventors: Merrill Harriman, Andover, MA (US); Alen Mehmedagic, Andover, MA (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/302,719

(22) PCT Filed: Jun. 9, 2017

(86) PCT No.: PCT/EP2017/064149
§ 371 (c)(1),
(2) Date: Nov. 19, 2018

(87) PCT Pub. No.: WO2017/212036
PCT Pub. Date: Dec. 14, 2017

(65) Prior Publication Data
US 2019/0297160 A1  Sep. 26, 2019

Related U.S. Application Data

(60) Provisional application No. 62/406,932, filed on Oct. 11, 2016, provisional application No. 62/354,799, (Continued)

(51) Int. Cl.
*H04L 67/56* (2022.01)
*G06F 9/48* (2006.01)
(Continued)

(52) U.S. Cl.
CPC ............ *H04L 67/56* (2022.05); *G06F 9/4856* (2013.01); *G06F 9/5027* (2013.01); *H04L 45/74* (2013.01);
(Continued)

(58) Field of Classification Search
CPC ......... H04L 45/74; H04L 67/12; H04L 67/28; H04L 67/10; H04L 67/2804; G06F 9/4856; G06F 9/5027; G06F 9/455; G06F 9/5038
(Continued)

(56) References Cited

U.S. PATENT DOCUMENTS 8,065,395 B2    11/2011  Burch et al.
2003/0005152 A1*  1/2003  Diwan ............... H04L 67/1008
                                                        709/239
(Continued)

FOREIGN PATENT DOCUMENTS

WO    WO2015084628    6/2015

OTHER PUBLICATIONS

Vocublary.com https://www.vocabulary.com/dictionary/intercept 2012 https://web.archive.org/web/20121031155302/https://www.vocabulary.com/dictionary/intercept.*

(Continued)

*Primary Examiner* — Tan Doan
(74) *Attorney, Agent, or Firm* — Locke Lord LLP

(57) ABSTRACT

Disclosed is a method for providing a proxy service in an industrial system, and in particular a Software Defined Automation system that includes a Software Defined Network with a network controller node. The method includes providing in such an industrial system, a proxy service engine comprising at least one proxy service node. And wherein the network controller node directs incoming service requests to proxy service nodes, based on a rule set. The proxy service nodes will process the service request, upon which the requested service will be delivered.

24 Claims, 11 Drawing Sheets

Related U.S. Application Data filed on Jun. 26, 2016, provisional application No. 62/354,683, filed on Jun. 24, 2016, provisional application No. 62/348,770, filed on Jun. 10, 2016.

(51) Int. Cl.
*G06F 9/50* (2006.01)
*H04L 45/74* (2022.01)
*G06F 9/455* (2018.01)
*H04L 67/10* (2022.01)
*H04L 67/12* (2022.01)

(52) U.S. Cl.
CPC ............ *G06F 9/455* (2013.01); *G06F 9/5038* (2013.01); *H04L 67/10* (2013.01); *H04L 67/12* (2013.01)

(58) Field of Classification Search
USPC ....................................... 709/238, 228, 22, 8
See application file for complete search history.

(56) References Cited

U.S. PATENT DOCUMENTS

| | | | | |
|---|---|---|---|---|
| 2006/0080321 A1* | 4/2006 | Horn | .................... | G06F 16/9535 |
| 2007/0168058 A1* | 7/2007 | Kephart | .............. | G06F 11/2028 |
| | | | | 714/E11.08 |
| 2007/0266120 A1* | 11/2007 | Tallieu | ................... | G06F 9/4416 |
| | | | | 709/220 |
| 2008/0115143 A1 | 5/2008 | Shimizu et al. | | |
| 2011/0022711 A1 | 1/2011 | Cohn | | |
| 2012/0196536 A1* | 8/2012 | Koo | ....................... | H04W 84/18 |
| | | | | 455/41.2 |
| 2012/0311375 A1* | 12/2012 | Shah | ..................... | H04L 67/563 |
| | | | | 714/E11.073 |
| 2013/0332938 A1* | 12/2013 | Deschler | ............... | G06F 9/5066 |
| | | | | 718/105 |
| 2014/0025770 A1* | 1/2014 | Warfield | ............... | G06F 16/256 |
| | | | | 709/213 |
| 2014/0244851 A1* | 8/2014 | Lee | ..................... | H04L 12/4641 |
| | | | | 709/228 |
| 2015/0081658 A1* | 3/2015 | Meyles | ............. | G06F 16/24561 |
| | | | | 707/706 |
| 2016/0088115 A1* | 3/2016 | Agnew | ............... | H04L 67/2842 |
| | | | | 709/206 |
| 2017/0094002 A1* | 3/2017 | Kumar | ................ | H04L 67/2861 |

OTHER PUBLICATIONS

Merriam Webster online dictionary "on behalf of someone".*
International Search Report for International Patent Application No. PCT/EP2017/064149, dated Sep. 4, 2017, 4 pages.
PCT Written Opinion of the International Searching Authority for International Patent Application No. PCT/EP2017/064149, dated Sep. 4, 2017, 8 pages.

* cited by examiner

METHOD AND SYSTEM FOR PROVIDING PROXY SERVICE IN AN INDUSTRIAL SYSTEM

CROSS-REFERENCE TO RELATED APPLICATION(S)

This application claims priority to and benefit from the following provisional patent applications: (1) U.S. Provisional Application Ser. No. 62/348,770 titled "Software-Defined Automation" filed on Jun. 10, 2016, (2) U.S. Provisional Application Ser. No. 62/354,683 titled "Software-Defined Automation Architecture" filed on Jun. 24, 2016, (3) U.S. Provisional application Ser. No. 62/354,799 titled "Software-Defined Automation Architecture" filed on Jun. 26, 2016, and (4) U.S. Provisional Application Ser. No. 62/406,932 titled "Software Defined Automation System and Architecture" filed on Oct. 11, 2016. The entire contents of the aforementioned patent applications are expressly incorporated by reference herein.

TECHNICAL FIELD

The invention relates a method for providing a proxy service in an industrial system. It further relates to a proxy service provider system.

BACKGROUND

Automation is the use of automatic control devices and various technologies to automate monitoring, operation and control of processes and installations without significant human intervention to achieve performance that is superior to manual control. Known automation systems for monitoring and controlling processes and installations typically comprise various automation devices such as control devices or controllers (e.g., Programmable Logic Controllers (PLCs), Programmable Automation Controllers (PACs)), input output devices (I/O devices), field devices (e.g., sensors and actuators), personal computers (PCs), Human Machine Interfaces (HMIs). Known automation systems utilize communication technologies (e.g., Ethernet) to communicate. An automation architecture defines the arrangement and relationships among the automation devices to satisfy certain constraints and requirements.

Industrial control systems comprise of devices with none or limited processing capabilities, or with basic or no services. For example, some devices may support only native protocols (Modbus TCP, EtherNet/IP). Other devices may not be capable of providing high end web pages. Replacing such devices with smart devices that support high end and/or high level protocols/web services can be prohibitively expensive, and not necessarily optimal.

SUMMARY OF INVENTION

In one aspect, a method is disclosed for providing a proxy service in an industrial system. The method includes providing in an industrial system having a Software Defined Network with a network controller node, a proxy service engine with at least one proxy service node. The method further includes the network controller node directing an incoming service request to the at least one proxy service node based on a rule set. And the at least one proxy service node processing the service request and delivering the requested service.

In another aspect, a proxy service provider system is disclosed. The proxy service engine having at least one proxy service node communicatively coupled with a network controller node of a Software Defined Network (SDN). The network controller node is arranged for directing an incoming service request to the at least one proxy service node based on a rule set. The at least one proxy service node is arranged for processing the service request and delivering the requested service.

BRIEF DESCRIPTION OF THE DRAWINGS

By way of example only, the embodiments of the present disclosure will be described with reference to the accompanying drawing, wherein.

DETAILED DESCRIPTION

Figure 1:
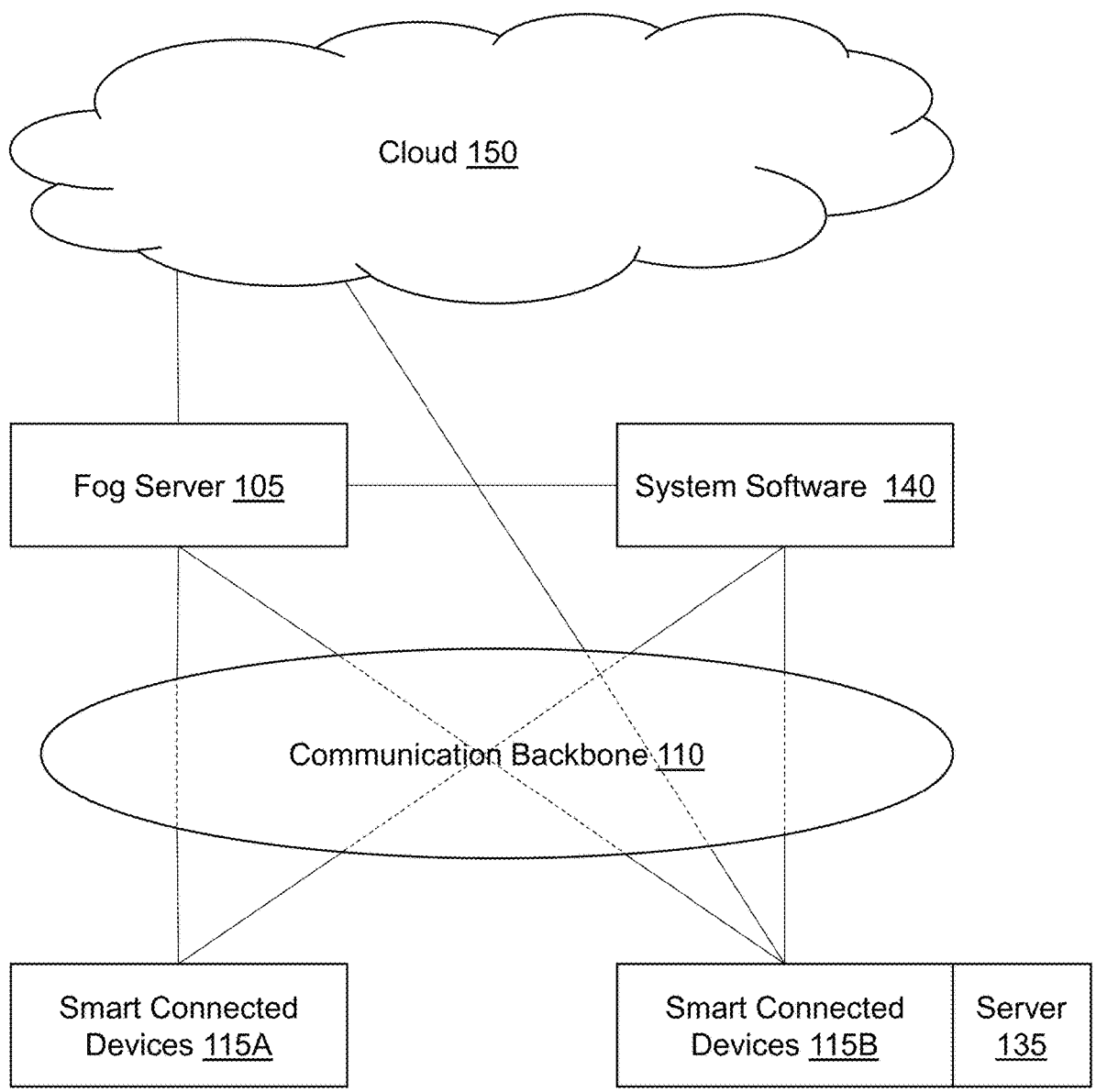
FIG. 1 is a diagram illustrating a simplified architecture of an SDA system.

There is a need to enable basic low capability devices to take part in enabling/providing high level tasks and services. This could be achieved by introducing proxy services. However, an industrial environment is an IP-centric system, meaning that communication protocols rely for addressing on a specific IP address. Hence, prior art proxy solutions implementing Name Resolution Services, such as DNS and WINS, cannot be relied on. As industrial communication protocols do not allow diverting a packet or service request to another address than the one explicitly specified as the target address.

To overcome the above disadvantages, the present disclosure describes a proxy service provider system operable in an industrial environment, such as a Software Defined Automation (SDA) system that includes a Software Defined Network (SDN) having a network controller. SDA provides a reference architecture for designing and maintaining a highly available, scalable and flexible automation system. SDA enables control system(s) and associated software to be run inside of a fog platform or a private cloud. Control system(s) of varying degrees of complexity can be found in traditional manufacturing facilities, refineries, submarines, vehicles, tunnels, baggage handling systems, energy management systems, building management systems, flood water control systems, grid control systems and the like. By moving the entire control system(s) or at least a portion thereof to a fog platform or a private cloud, and providing a software interface to the control system elements, SDA enables engineering tasks over the whole lifecycle of automation engineering such as design, programming, configuration, installation, running, maintenance, evolution and shut down to be performed in a simpler, more efficient and cost effective way. SDN enables separation of a network's control logic from the underlying network hardware or device (e.g., switches, routers) and logical centralization of network control, enabling network elements or devices which include switches and routers as well as any nodes taking on a similar role to be configured and reconfigured in a simpler way without having to access each physical device. For example, each network device can be accessed by the logically centralized SDN controller using a set of protocols.

In various embodiments of the proxy service provider system, network controller may be configured to re-direct the flow of communication depending on criteria different from the IP-address, such as type of protocol, a service request type, a source type, sub-functions of a protocol, type of optional commands, additional SNMP MIBs, alternate or augmented webpages, data content. In this manner, a proxy device can be set up/configured to handle communication on behalf of a target device that was actually addressed. Such a proxy device will be referred to as a proxy service node. Or, more in general, referred to as a proxy service engine, which may comprise one or more proxy service nodes, which may be distributed across the SDA-system.

The present disclosure also describes a method for providing proxy services in an industrial system including a Software Defined Network (SDN) having a network controller.

An SDA system may be configured and tested during the design and commissioning phases. An SDA system may also be re-configured when in operation. In any of these phases an automation portal enables an operator or other user to interact with the automation system.

Via the automation portal a user may choose to set up services which need to be delivered by the system. For example, for the control of a pump station it may be convenient to take in account of rainfall which could require to scale up the pumping activity. Thus, a service providing a graph of rainfall prediction together with the pumping rate of one or more pumps, or other process data, would be useful.

Such services may be designed by a user by configuring the proxy service node to collect or aggregate data and make these available as one service request. The automation portal will create a rule set or scheme of rules for handling the newly created service request. The SDN network controller will then update its rule set and arrange and direct traffic taking in account the updated rule set. In addition, this rule set may be dynamically updated, changed or replaced over time.

The proxy service engine will handle the traffic directed thereto e.g. by processing a request or data, or by responding to a request, etc. The proxy service engine may collect data from distributed devices, aggregate information and present those as a single service response.

This relieves the basic device from supporting the high-end protocols, thus reducing its firmware and hardware footprint, and subsequently cost, while maintaining the required capabilities.

Legacy devices could appear to have the latest technology in web services that are always up to date. This could also have a significant positive impact on performance and determinism for the basic device's native protocol as the device can be very optimized for its control system functionality. Additionally, maintenance and upgrade efficiencies could be realized by having the complex high-end services in a central location rather than distributed across numerous products in the customer's network.

The proxy paradigm is counter to the embedding of every last capability into the devices to make them as smart as possible. One of the problems with this smart device approach is that it has negative impact on cost and performance as the devices need to be able to support not only their main function but also a plethora of other services as well. In the end the customer only really cares that the service is provided in the system. The disclosed proxy service technique is not to make smarter devices, but to make more efficient dedicated devices and to use the system solution to bring capabilities far and beyond what a smart device could ever provide. Once the services are distributed and virtualized they could employ big data concepts to provide capabilities never seen before in an industrial control system.

FIG. 1 is a diagram illustrating a simplified architecture of an SDA system in accordance with some embodiments. The architecture depicts a fog server 105 linked to a system software 140, and smart connected devices 115A, 115B that are communicatively coupled to the fog server 105 and the system software via a communication backbone 110. The architecture also depicts that at least some smart connected devices 115B and the fog server 105 can be communicatively coupled to a cloud 150.

The fog server 105 is comprised of a collection of control resources and compute resources that are interconnected to create a logically centralized yet potentially physically distributed system for hosting the automation systems of an enterprise. The "fog server" or "fog platform" as used herein is a cloud management system (or localized subsystem or localized system) that has been localized into one or more compute and/or control nodes. In other words, the fog server 105 is cloud technology that has been brought down to the local ground or installation (hence the term "fog") in the form of one or more compute and/or control nodes to manage the entire automation system or a portion thereof. The fog server 105 enables virtualization by providing a virtualization infrastructure on which automation system(s) can be run and/or managed. The virtualization infrastructure includes compute nodes which execute hosts such as virtual machines, containers and bare metals (or bare metal images). The hosts themselves can execute guests which include applications and/or software implementations of physical components or functional units and an automation portal or system software 140. As used herein, virtualization is the creation of a virtual version of something. For example, a virtual component or a virtualized component (e.g., a virtual PLC, a virtual switch, network function virtualization (NFV)) represents a function that is executed on a host running on a compute node. It does not have a physical existence by itself. Fog server 105 need not be localized in a centralized control room; controllers, devices and/or servers 135 close to the sensors and actuators (e.g., 10 device, embedded device) can also be considered under the management of the fog server 105. In some embodiments, the fog server 105 can also aggregate, store and/or analyze data, and/or report the data or analytics to the cloud 150. The cloud 150 can be an enterprise cloud (i.e., private cloud), public or hybrid cloud. The system software 140 provides a single entry point for an end user to define (e.g., design, provision, configure, and the like) the automation system. One way to define the automation system is by managing distribution of applications/application functions where users want them to be executed.

The smart connected devices 115A, 115B (also smart connected products) monitor and/or control devices, sensors and/or actuators close to equipment/raw materials/environment by executing applications/application functions. In various embodiments, a smart connected device has the following features: (1) physical and electrical components, (2) firmware or a "smart" embedded part, and (3) connectivity and interoperability. In some embodiments, a smart connected device can also have a cybersecurity component that may be running remotely, or on board.

Some smart connected devices 115A can run applications or application functions ("applications") locally (e.g., the speed/torque regulation loop of a speed drive) because they have the processing capability to do so. This means that there is no need to execute those applications elsewhere (e.g., on a connected PC, a server or other computing devices) to get data to perform its functions. This has the advantage of faster response time (i.e., less latency) and savings on network bandwidth. Another advantage of on-board or local execution of applications is that it improves the consistency of data and the robustness of the architecture because the device can continue to produce information (e.g., alarm) or to log data even if the network is down.

In some embodiments, smart connected devices 115B can be wholly or partially executed in one or more servers (e.g., server 135, fog server 105). For example, a smart connected device 115B can be responsive to remote signals (e.g., remote method calls, application programming interface or API calls) as if an application is running locally, when in actuality the application is running remotely, for example in the fog server 105. In some embodiments, smart connected devices can capture real-time data about its own state and the state of its environment (e.g., the devices it is monitoring) and send such data to the fog server 105 and/or a remote cloud 150. In some embodiments, the smart connected devices 115A, 115B can transform the captured real-time data into information (e.g., alarms), store them and perform operational analytics on them.

The smart connected devices 115A, 115B can then combine both monitoring and controlling functions described above to optimize own behavior and state.

The communication backbone 110 facilitates interaction between the fog server 105, the system software 140 and the smart connected devices 115A, 115B. The communication backbone (or the Internet of Things (IoT)/Industrial Internet of Things (IIoT) backbone) encompasses a set of network architectures and network bricks that enable physical and logical connections of the smart connected devices 115A, 115B, the fog server 105 and any other components that are part of the SDA architecture. For example, various equipment in a plant can be connected to each other and with the enterprise system (e.g., MES or ERP) using technologies based on various standards such as: Ethernet, TCP/IP, web and/or software technologies. The communication backbone in the form of a unified global Industrial Ethernet backbone can provide: an easy access to the data, from the plant floor (OT) to the enterprise applications (IT), a flexible way to define different types of network architectures (e.g., stars, daisy chain, ring) fitting with customer needs, robust architecture that can fulfill requirements such as availability, safety and harsh environment support and the right information to the right people at the right time in one cable.

The communication backbone 110 includes a full Industrial Ethernet infrastructure offering switches, routers and/or cable system to address the needs of all topologies. The communication backbone 110 also supports a set of connectivity protocols based on standards based on various standards (e.g., Modbus/TCP-IP, Ethernet IP, OPC UA, DHCP, FTP, SOAP, REST etc.). The communication backbone 110 can also support a set of web functions offering functions like diagnostic, monitoring and configuration using standard web pages and device integration reference architecture that defines the patterns, brick to integrate group of devices to controllers at application level and network level for configuration, tuning and diagnostic. In some embodiments, cyber security elements can be built in to the architecture. The communication backbone 110 also adheres to a set of architecture rules structuring the architecture at performances (Quality of Service or QoS), robustness (RSTP and PRP HSR for redundancy) and safety level (IEC61508). In some embodiments, the communication backbone 110 also supports integration of a set of gateways to connect to legacy (i.e., non-Ethernet) equipment to the network.

The communication backbone 110 can use multiple protocols to provide multiple services to fill multiple needs. Some examples of communication needs and suitable protocols are listed in table 1.

TABLE 1

| Services and Protocols | |
|---|---|
| Service | Protocol |
| Device to device | Modbus/EtherNet/IP, DDS, OPC UA, pub/sub |
| Device to control | Modbus/Eip, NTP, DHCP, FTP |
| Device to control for hard real-time | SercosIII, Profinet IRT, EtherCat |
| Control peer to peer | DDS, OPC UA, pub/sub |
| Control to control room | OPC, Modbus, TCP |
| Across architecture | Modbus/Eip, SNMP, SMTP, NTP, HTTP, FTP |

The networks in the existing systems are very segmented to allow guaranteed or reliable communication. The communication backbone 110 in the SDA architecture can overcome the problems of the existing systems through Software Defined Networking (SDN) and Time Sensitive Networking (TSN) technologies. SDN technology can bring simplicity and flexibility in these networks allowing communication at and through different layers driven by network policies. TSN technology adds a set of capabilities to standard Ethernet to provide real time capability and time guaranteed exchanges in areas or through the whole architecture. Moreover, cybersecurity solution can also be integrated and adapted to the SDA architecture.

Figure 2:
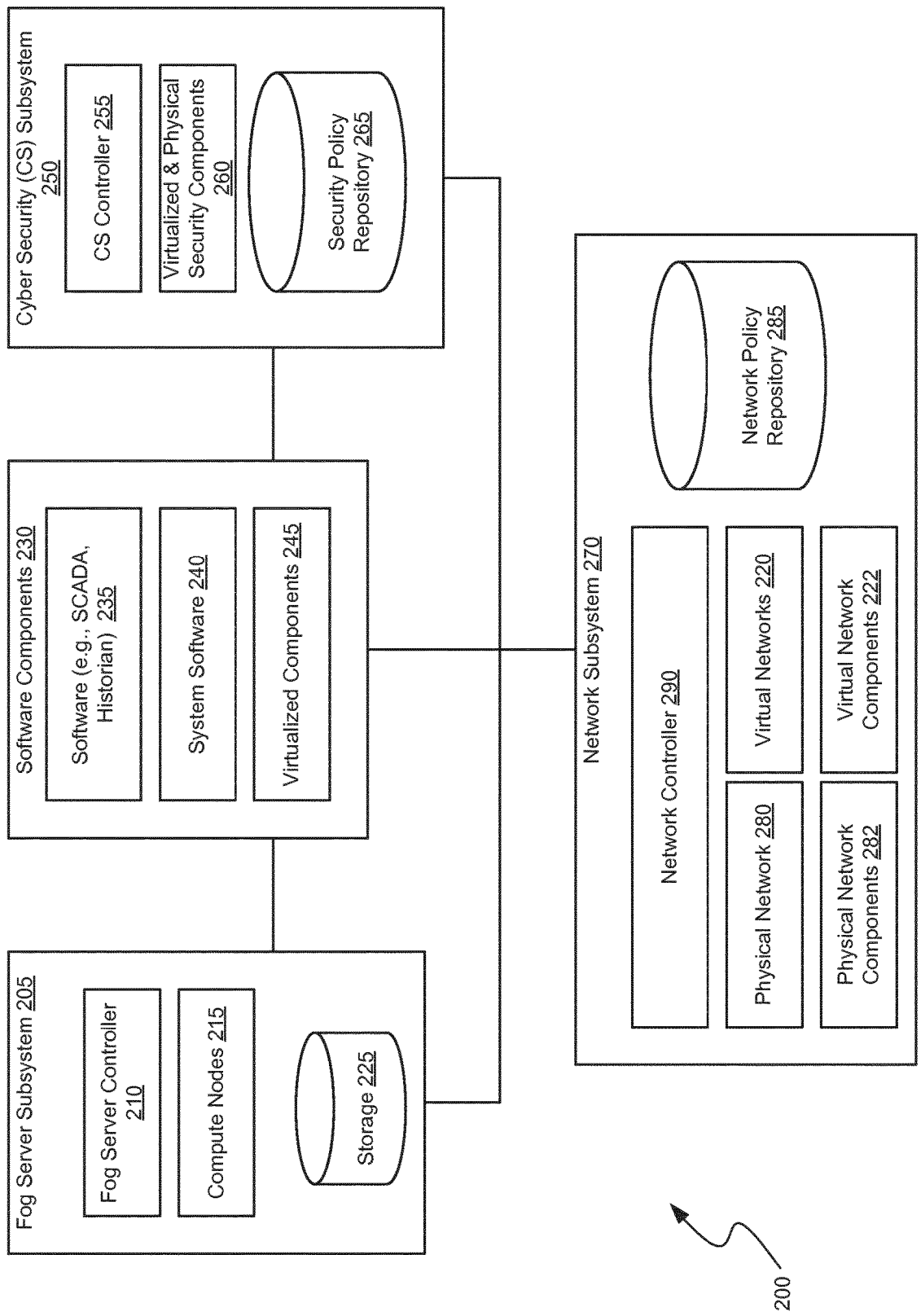
FIG. 2 is a block diagram illustrating subsystems of an SDA system in accordance with some embodiments.

An SDA system comprises of various subsystems that work together to provide a fully integrated solution for creating, managing and operating automation systems. FIG. 2 is a block diagram illustrating the subsystems of an SDA system in accordance with some embodiments. An SDA system 100 in some embodiments includes a fog server subsystem 205 ("fog server") having a fog controller or redundant fog controllers 210, one or more compute nodes 215 and storage 225. The SDA system 200 also includes a software components subsystem 230. In other embodiments, the SDA system can further include a cybersecurity ("CS") subsystem 250 having a security controller or redundant security controllers 255, physical and/or virtualized security components 260 and a security policy repository 265. In yet other embodiments, an SDA system can also include a network subsystem 270 having a network controller or redundant network controllers 290, physical network 280, physical network components 282, virtual networks 220, virtual network components 222 and a network policies repository 285.

The fog server 205 provides a virtualization environment on which automation system(s) can be run and/or managed. The fog server 205 comprises compute nodes 215 which provide logic processing capabilities and can host applications, databases and the like with a high level of elasticity. Non-limiting examples of compute nodes include: servers, personal computers, automation devices including smart connected devices and the like.

The fog server controller 210 utilizes a fog server management software to perform its functions.

The fog server management software can be based on cloud management software such as OpenStack. Cloud management software such as OpenStack in their standard/off-the-shelf form are typically used in the Information Technology (IT) world for data center management. Automation system management, however, involves different set of challenges. For example, some automation systems can run time-critical and/or safety-critical applications that need deterministic guarantees with respect to delay, reliability and/or other factors. Consider an automated cheese slicing system where a high speed synchronized motion between a knife blade slicing through a cheese block and the movement of the cheese block is critical to produce cheese slices of uniform thickness. If there is any processing or network delay, it can result in cheese slices of different thickness, resulting in wastage and loss of productivity.

The fog server controller 210 manages all aspects of the virtualization environment and the complete life cycle of the compute nodes 215. For example, the fog server 205 can stand up and stand down hosts such as virtual machines, containers or bare metals on compute nodes, and create and destroy virtualized components 245 and virtual networks 220. A virtualized component/element/instance 245, as used herein, is a logical equivalent of a physical device or a portion of the physical device it represents, implemented as a software entity to run inside of the fog server 205. Virtualized components 245 can also include software components such as applications and/or application functions on a host (e.g., a virtual machine configured with an application is a virtualized component/element/instance).

The fog server controller 210 can provide high availability (HA) through redundancy of the controller and management of compute node failures. The controller can also manage startup, shutdown and patching of the individual compute nodes. In some embodiments, the fog server platform can provide support for high availability of virtualized components. In some embodiments, the fog server 205 can include a storage node or data store 225. The storage 225 can store virtual images, volumes (i.e., hard drive of an instantiated image), application and process data, and the like.

The software components subsystem 230 can include virtualized components 245 that are hosted by the virtualization ecosystem of the fog server 205. The software components subsystem 230 can also include virtualized instances of software 235 that run within the virtualization environment (e.g., software for programming, configuration, and/or management (e.g., Unity, SoMachine, SCADA) that are used to program, configure, manage or otherwise interact with automation devices. In some embodiments, the software component subsystem 230 can also include a system software 240 (also called automation portal) that provides a single interface for managing topology, inventory, configuration, programming, control, and/or diagnostics of the automation devices and/or the automation system as a whole.

Through the system software 240 users can access various applications for system definition and system management over all life cycle phases. For example, the system software 240 can be used to configure and parametrize equipment during the engineering phase and tune, program, and/or diagnose equipment during the maintenance phase. Some of the benefits of the system software 240 includes simplicity and ease for end users and cost reduction as all aspects of any equipment in an automation system can be managed from a single portal. In addition to providing a single entry point to the entire system, the system software 240 also presents a consistent user interface and user experience, which help reduce inconsistency and increase efficiency and productivity.

The Cybersecurity (CS) subsystem 250 includes an associated CS controller or redundant CS controllers 255 and virtualized and/or physical security components 260. The security subsystem 250 provides a holistic cyber-security solution through security policies and security components such as intrusion detection/protection systems, virtualized next generation firewalls, certificate authority and identification systems, and the like. The CS controller 255 disseminates security policies to the virtualized and/or physical components to ensure that necessary security protections are put in place. In some embodiments, the CS subsystem can also provide security policy and authentication services to other components and subsystems. The security policies of the CS system 250 can be stored in a security policy repository 265 in some embodiments.

The network subsystem 270 includes the Ethernet network infrastructure for the entire SDA system solution. In some embodiments, the network subsystem 270 is an SDN network subsystem having an SDN controller or redundant SDN controllers as the network controller 290. The SDN network provides separation of network's control logic from the underlying network hardware (e.g., routers, switches) and logical centralization of network control through the SDN controller. This means that the SDN controller can disseminate network policies throughout the network infrastructure (i.e., physical network 280 and physical network components 282 as well as virtual networks 220 and virtual network components 222) to control connectivity, bandwidth and latency, Service Level Agreements (SLAs) (e.g., re: deterministic response time/transfer time), traffic flow control, etc., and the network hardware can implement those policies. The network policies of the network subsystem 270 can be stored in a network policy repository 285 in some embodiments.

In some embodiments, the network subsystem 270 can comprise a mesh radio network. In mesh radio network, each node can connect to at least two other nodes with data being passed from node to node in a process called hopping. Because the nodes themselves serve as routers, radio mesh networks typically do not require designated routers. However, some mesh radio networks include one or more mesh routers along with the mesh nodes to relay traffic on behalf of other mesh routers and/or mesh nodes. In some embodiments, the network subsystem 270 can comprise virtual circuits on a high-speed radio frequency (RF) mesh or hybrid network with communication facilitated by only the radio transceivers of the nodes, without any external devices. Thus, in some embodiments, configuration of network elements of network subsystem or network infrastructure can include configuration of the mesh nodes and/or mesh routers (e.g., OpenFlow enabled mesh routers) in the mesh radio network.

In some embodiments, the network subsystem 270 can be a Time Sensitive Network (TSN) subsystem having a TSN controller as the network controller 290 and TSN infrastructure. The TSN network subsystem ensures that mission critical and time-sensitive data are transferred/shared as per predefined maximum deterministic transfer time and with high reliability. Typically, TSN infrastructure includes TSN capable network components. It should be noted that in some embodiments, the network subsystem 270 can comprise both SDN and TSN networks (and thus SDN and TSN controllers and SDN and TSN components). In various embodiments, the network controller 290 can be a native fog server virtual network controller, a traditional network management system controller, an SDN controller, a TSN controller, and/or any combination thereof.

The roles of the subsystems in the SDA solution complement each other to provide a fully integrated solution. Specifically, the fog server 205 can interact with each of these subsystems through hosting virtualized elements of the subsystem and/or through the control functions of the subsystem.

Figure 3:
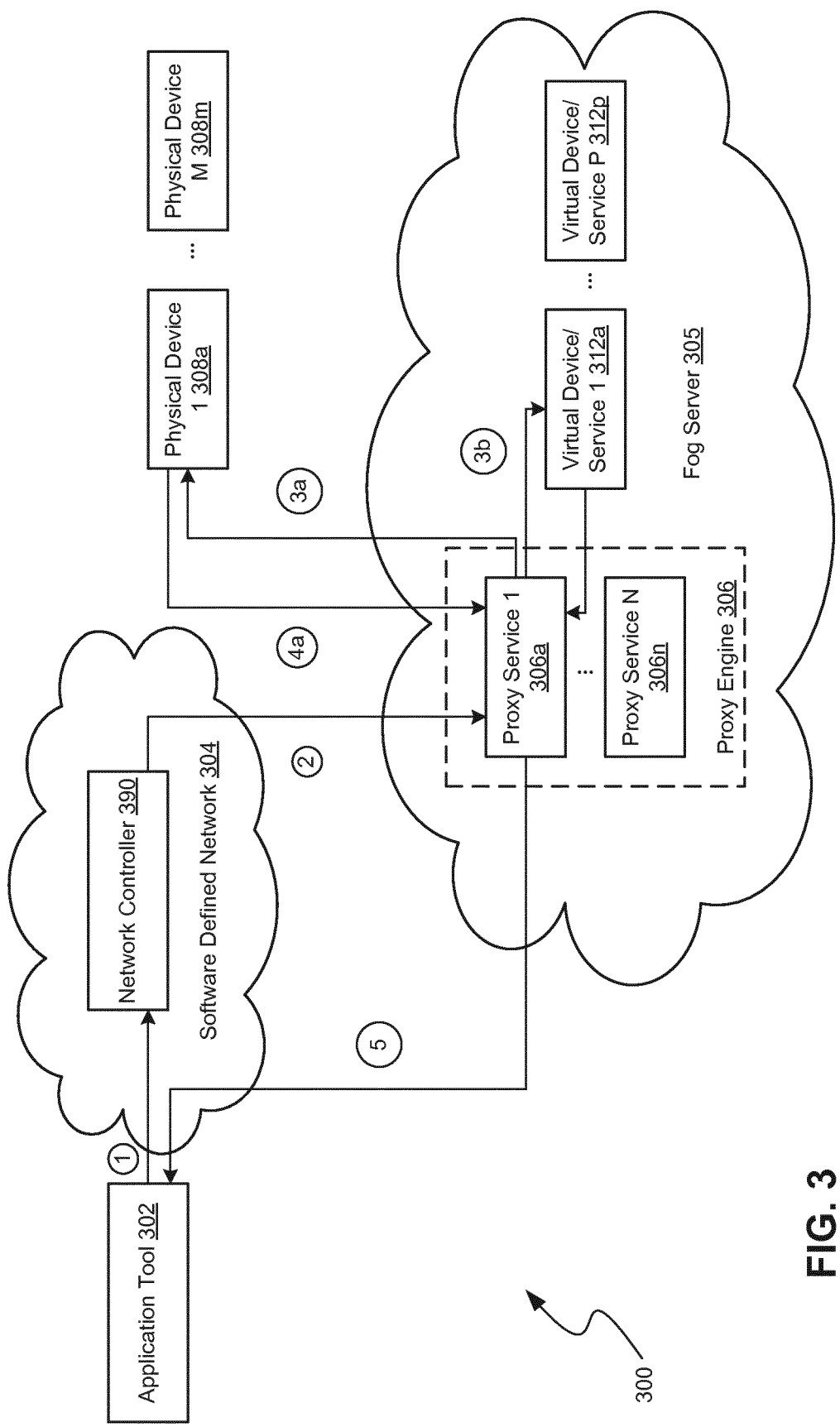
FIG. 3 is a block diagram illustrating an example of a system in which a method for providing proxy services may be implemented.

Referring to FIG. 3, an example system according to some embodiments is shown. The -system 300 includes an application tool 302, a Software Defined Network (SDN) 304 having a network controller node 390, a proxy service engine 306 comprising of proxy service nodes 306a-306n, physical devices 308a-308m and virtual devices 312a-312p.

The application tool 302 allows an operator or other user to interact with the -system 300 and enables control and configuration of the system 300. The application tool 302 may be part of or be available through an automation portal or system software 240. The network controller node 390 orchestrates, configures, and provides communication within the system 300 between the various devices and components over the Software Defined Network 304.

Various physical devices 308a-308m may be present in the system 300, depending on the type of machine or plant that is automated/operated. Similarly, the system may employ various virtual devices 312a-312p execute one or more automation functions on hosts running on compute nodes in the fog server 305. The proxy service engine 306 may comprise of one or more proxy service nodes 306a-306n, of which each may be addressable by the network controller node 390. In various embodiments, the proxy service engine 306 may reside in the fog server 305. In other embodiments, it may reside in a separate computer resource, a compute node, a PLC or other control device, or any other resource providing processing capabilities. Furthermore, the proxy service engine may be distributed over any of the above-mentioned elements.

Figure 4:
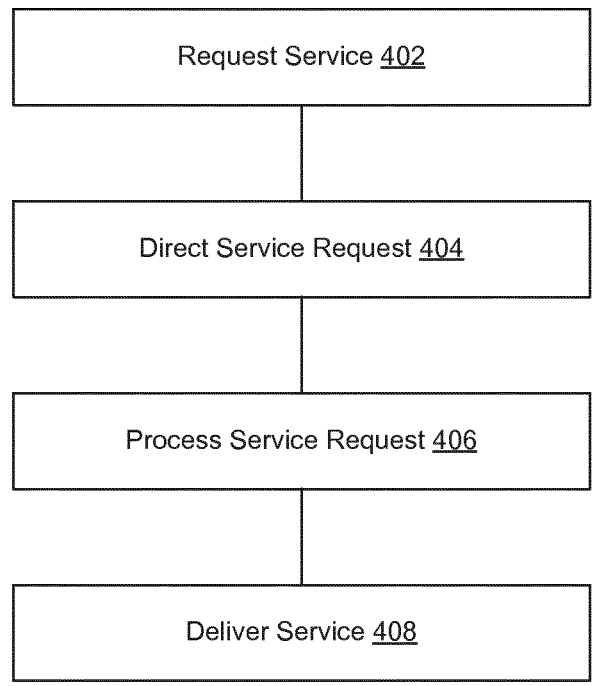
FIG. 4 is a flow diagram illustrating an example of a method for providing proxy services in the system of FIG. 3.

Referring to FIG. 4, an example of a method for providing proxy service is illustrated. The method will be explained by reference to the example the system 300 of FIG. 3. From the application tool 302 a service is requested 402. The network controller node 390 directs 404 the incoming service request to at least one proxy service node 306a-306n. This directing 404 of the service request is based on a rule set. The at least one proxy service node 306a-306n processes 406 the service request and delivers 408 the requested service (i.e., delivers response to the service request).

The rules present in the rule set may be set in advance by the application tool and/or may be re-configured during operation. The rule set may include destination i.e. target addresses for physical automation devices (e.g., physical devices 308a-m), virtual automation devices (e.g., virtual device 312a-p) and proxy service nodes (e.g., proxy service nodes 306a-n). The rule set may further include associations of predetermined criteria and each of the target address. Thus, one criterion or a combination of multiple criteria together may be associated with a particular destination address. The predetermined criteria may include, but are not limited to: an IP-address, package content, message content, a protocol type, a service request type, a device type, a source type or combinations thereof. Other criteria may include sub-functions of a protocol, type of optional commands, additional SNMP MIBs, alternate or augmented webpages, and/or data content. Optional commands would be commands available e.g. within a protocol, but not necessarily supported by a legacy device.

In this manner, the service request is still addressed to the target device, but the communication flow is redirected (e.g., by the network controller 390) based on one or more of the predetermined criteria. This allows the request to be serviced on behalf of the target device. Accordingly, a proxy service engine i.e., a collection of logically centralized high-end service proxies, could be set up to provide network wide capabilities for various services.

Figure 5:
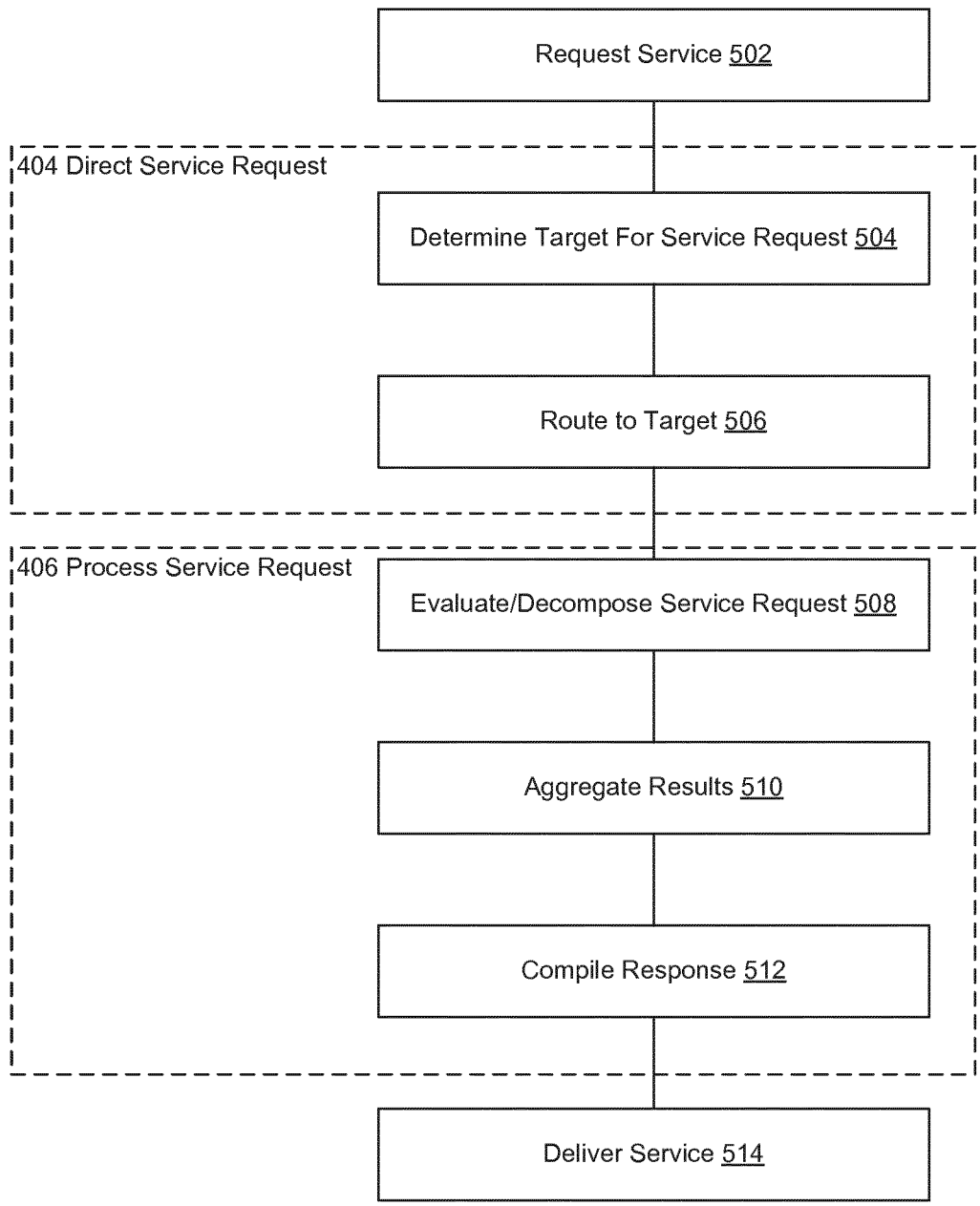
FIG. 5 is a flow diagram illustrating the example FIG. 4 in more detail.

Turning to FIG. 5, the method of FIG. 4 is illustrated in more detail. Herein directing 402 the service request may comprise of determining 504 a target address in accordance with the rule set and routing 506 the service request to the determined target address.

The method illustrated in FIG. 5 shows in further detail that processing 404 the service request may include decomposing or deconstructing 508 the service request, aggregating 510 results required to respond to the service request, and compiling 512 the requested service response.

Figure 6:
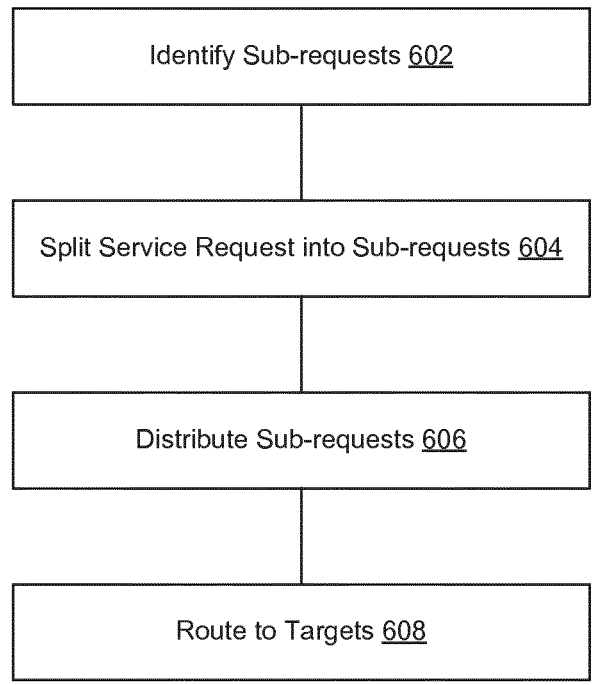
FIG. 6 is a flow diagram illustrating an example for decomposing a service request in accordance with the example of FIG. 5.

As shown in FIG. 6, decomposing 508 the service request may include splitting 604 the service request in one or more sub-requests or tasks to be handled by the proxy service nodes, and/or one or more physical automation devices, and/or one or more virtual automation devices. The service request may indicate the presence of tasks that may be handled separately, e.g., when these have been selected by an operator via the application tool from a list of tasks available from the SDA-system to provide a combined service. In addition, or when such indication is not present, the proxy service engine may be configured to identify tasks required for the requested service. Thereto, decomposing 508 the service request may further include identifying 602 tasks listed in a service configuration set.

With the service request split 604 into sub-requests or tasks, these tasks may be distributed 606 for further processing by particular dedicated physical and virtual devices or the proxy service node itself. Wherein distributing means the process of allocating or assigning each particular task to its' associated target for processing: physical/virtual device or proxy service node. If tasks are distributed to physical or virtual devices, the proxy service node will route 608 these tasks to the target devices.

In some embodiments, a service configuration set may list tasks for processing packets or more in general processing communication flow, for aggregating diagnostic data, and/or for responding to services request. It may further include forwarding IP-addressed packets to a target automation device identified by the IP-address, for compiling a requested service response, for delivering results of a compiled service, and/or for tracking an identity or ontology of the at least one automation device. The service configuration set may be stored and maintained by the proxy service engine 306 and accessible via the application tool 302. Or it may be stored and maintained in any other suitable location, such as the application tool 302 or the network controller node 390.

The application tool 302 may have a catalog of available services, or be able to retrieve a list of available services. An operator may pick & choose services from a list of available services to build custom services. Similarly, the application tool 302 may also access a catalog of available tasks or sub-requests from which an operator can build one or more custom services. The Software Defined Network 304 including the network controller node 390, will then orchestrate the configuration of the custom services.

Example 1—Upgrading Legacy Device with Outdated Function

Figure 7:
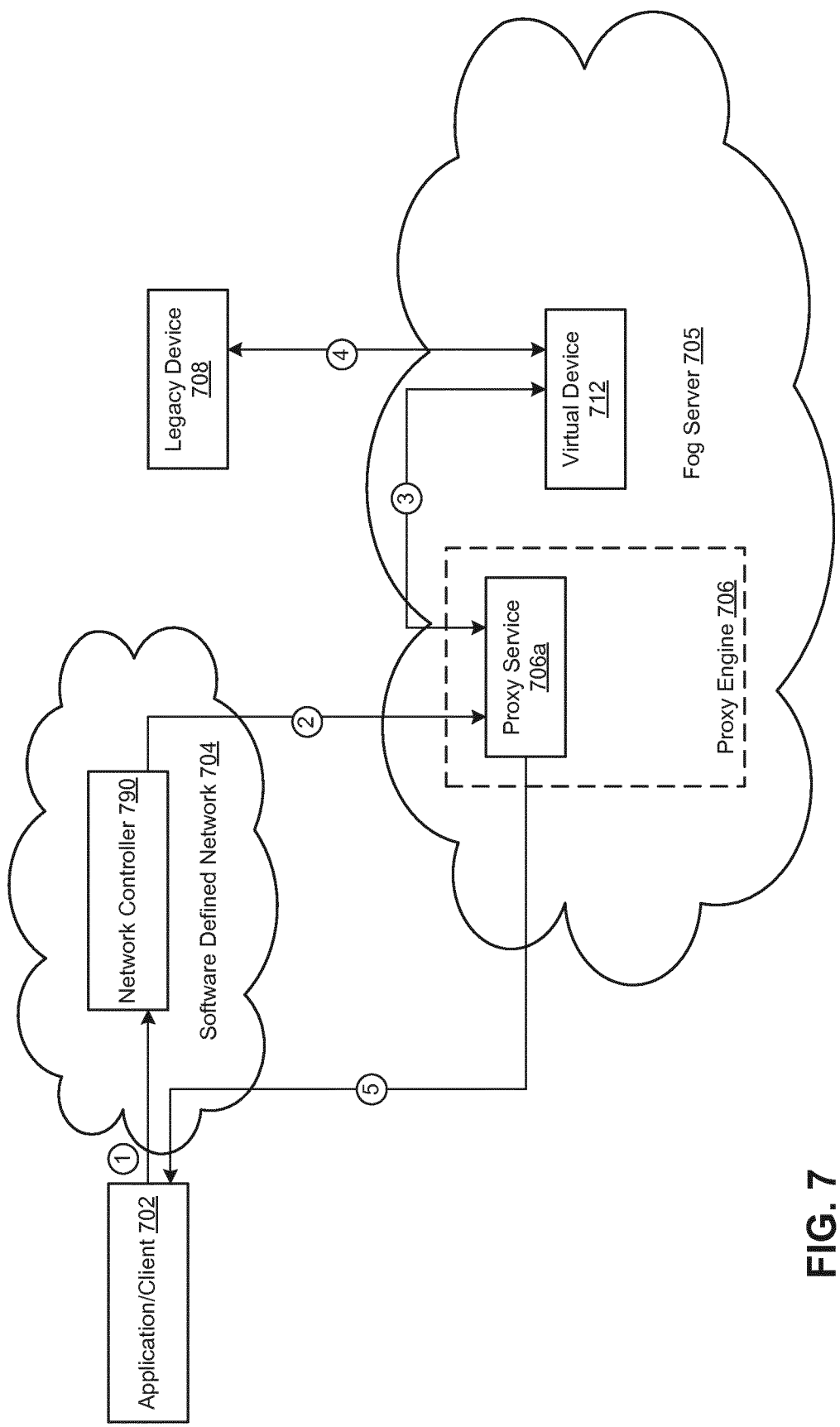
FIG. 7 is a block diagram illustrating an example of a system for upgrading a legacy device in accordance with some embodiments.

As an example of an application of the method as disclosed, a legacy device that would require a firmware update in order to e.g., address a security risk, or any other functionality could be 'virtually upgraded'. Thereto, referring to FIG. 7, the proxy service node 706 may be configured to direct the firmware upgrade or software patch to a virtual device 712. The virtual device 712, which could run on a separate compute node in the fog server 705 or within the proxy service engine 706, would then, instead of the legacy device 708, be installed with the firmware update or software patch. Once installed, all communications and/or service requests intended for the legacy device 708 would be directed to the virtual device 712. This would allow virtually upgrading legacy devices 708 which would not be able to execute the updated firmware and even allow virtually upgrading legacy devices that were not designed to obtain upgrades. Another example of functional upgrades could be expanded to web services, such as using a different company logo on a website presented by the legacy device. Further examples of functional upgrades could include improvements of the look & feel of services delivered by a legacy device, such as e.g. a graphical user interface (GUI), branding or other interface elements presented to an operator.

Example 2—Enhancing a Basic Physical or Virtual Device

Figure 8:
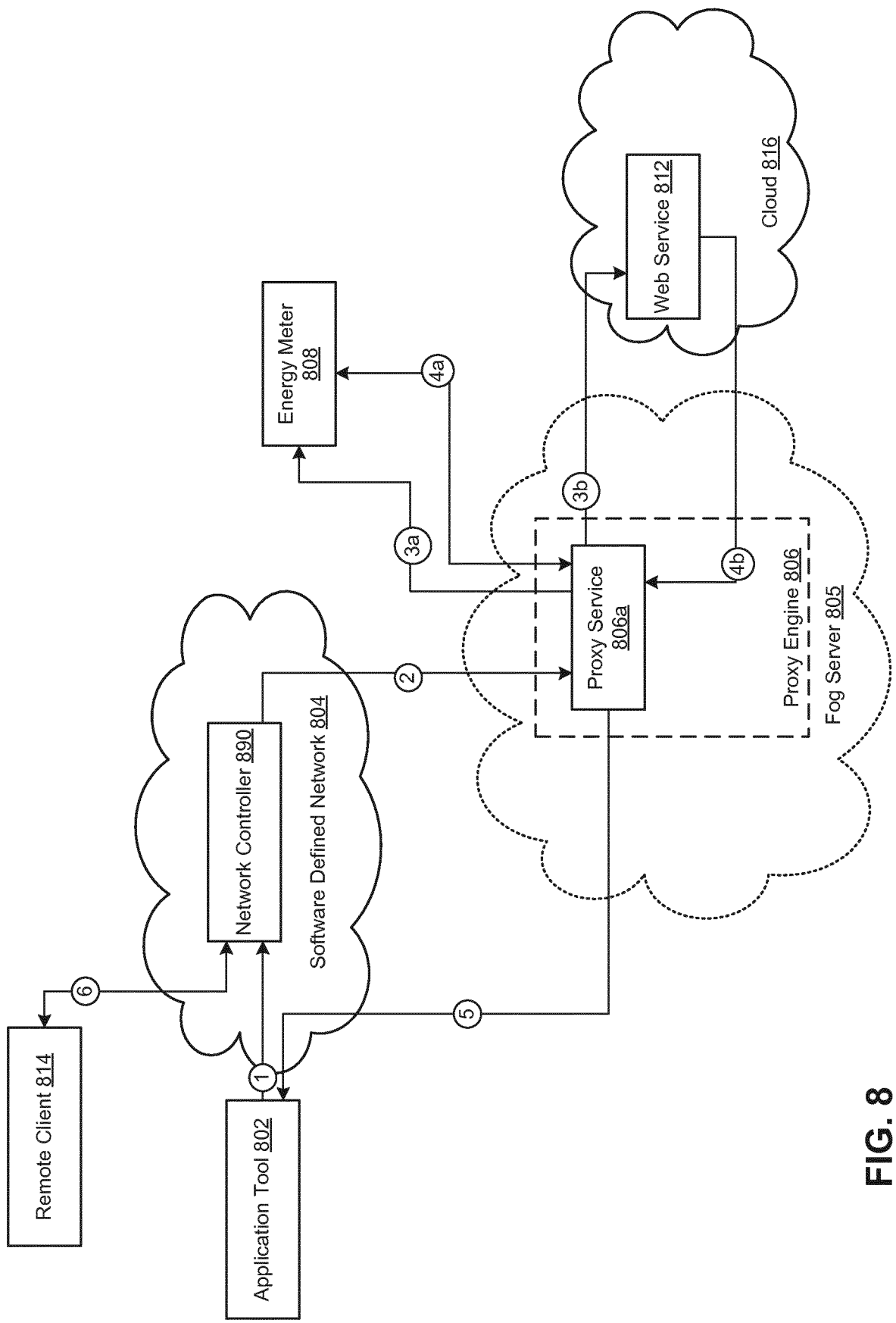
FIG. 8 is a block diagram illustrating an example of a system for enhancing basic functionality of a physical or virtual device in accordance with some embodiments.

As another example of an application of the method as disclosed, high end web pages could appear to be provided by the most basic physical or virtual device while in fact the service request was intercepted and redirected by an SDN controller to a virtual proxy service. The proxyed service would use the actual target device's native protocols (Modbus TCP, EtherNet/IP, BacNet, or the like) to gather data from the device in order to construct the requested web service response. For example, referring to FIG. 8, a battery charging station which charges a battery through a solar panel equipped with a basic energy meter 808 such as a light intensity meter could only deliver the current value of the light intensity. A proxy service node 806 would then aggregate the light intensity data over time and a virtual web service 812 connected to the cloud 816 would deliver local weather forecasts. These communication flows could then be combined to not merely predict when the battery will be fully charged based on the instant light intensity value, but take into account the weather forecast to predict the charging rate and an enhanced prediction of when the battery will be fully charged.

Thus, a service request from a remote client 814 for a detailed indication of full capacity will be directed by the network controller node 890 to the proxy service node 806. The proxy service node 806 will split the service request in sub-requests or tasks for retrieving the aggregated data from the light intensity meter 808 and for retrieving the weather forecast from the web service 812. Responses from these distributed tasks are then compiled and delivered as a single service or response to the service requester.

As another example of enhancing a basic physical device, support of diagnostic queries could be enabled. Some legacy devices do not support a full complement of network diagnostic information. Yet the network controller and/or the SDN switches in the network can derive much of this information by observing the traffic to and/or from the device. For example, since the network controller would be involved in the creation and deletion of network connections, such as a Modbus TCP connection, to a device, the network controller can track the existence of these connections on behalf of the legacy device. Then an SNMP proxy service, or other such diagnostic service, could respond, on behalf of the legacy device, to queries of existing Modbus TCP connections by collecting the information from the network controller. Although it would appear to the user that the device supports listing of the current Modbus TCP connections, in reality, the physical device would not be involved in the query at all. The original query from the diagnostic client is directed by the network controller to the SNMP Proxy service. The SNMP Proxy service interrogates the network controller diagnostic data to get the list of current connections to the legacy device. The SNMP Proxy service than responds to the query with the detailed connection information. The physical device does not need to be involved in the diagnostic query transaction in any way.

Example 3—Addressing a Non-Existent Device Via its IP Address

Extending the distributed virtualization concept further, the target device could actually be a distribution of services spread across multiple virtual entities; the actual device does not exist in any one place but multiple places within the virtualization system (i.e., the fog server) and/or the cloud. In effect, what appears from an external view to be a device with a certain set of capabilities is actually an enigma. The "target device's" services are an abstract collection of stand-alone services that collectively present some particular desired behavior. For example, a SysLog service that logs events such as login/log off, operational processing changes, state changes such as high/low speed, shut down, errors, etc. Furthermore, swarm techniques could be used to direct the behavior of the collection of stand-alone services to provide a unique capability. For example, an energy management service could be provided that allows shutting down non-critical functions.

Example 4—Enhancing Legacy Device with Incompatible Protocol

Figure 9:
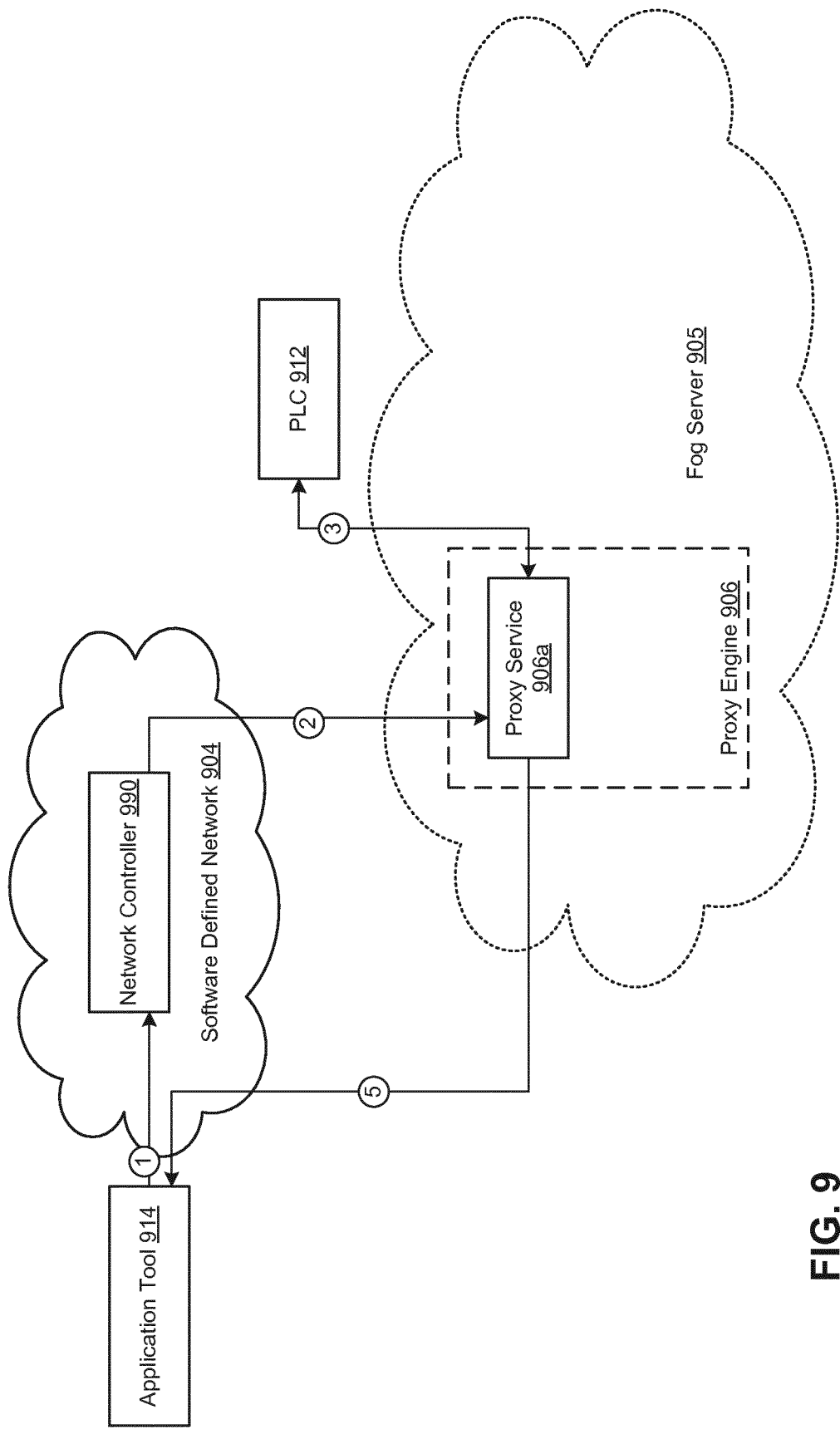
FIG. 9 is a block diagram illustrating an example of a system for enhancing a legacy device with incompatible protocol in accordance with some embodiments.

Referring to FIG. 9, an example system that includes application tool 914, network controller node 990, proxy service node 906 and a legacy industrial device (e.g., PLC) 912 is depicted. The PLC device 912 is only equipped with a protocol stack for ModBus and does not support IP/Ethernet. In order to enhance communication with the PLC device 912, the proxy service node 906 is configured to include a ModBus register. The proxy service node 906 is now able to translate any ModBus device entity into an IP/Ether net address, much like a regular DNS server for Ethernet/IP. In this manner, the inherent functionality of the PLC device 912 is extended beyond its' basic capabilities.

Example 5—Motor Ramping

As an example of a customized service, a drive motor only capable of being operated in a particular manner, such as on/off mode, could be provided with expanded modes such as e.g. ramping, by building a customized service based on the basic functionality. This could, for example, be achieved by designing a service that allows configuring a switching pattern that turns the motor drive on/off in such a manner that the drive can speed up or down in a more controlled manner. Thus, whereas the legacy device would only support its' basic operational mode, use of the proxy node service would allow adding additional operation modes to the motor drive.

Figure 10:
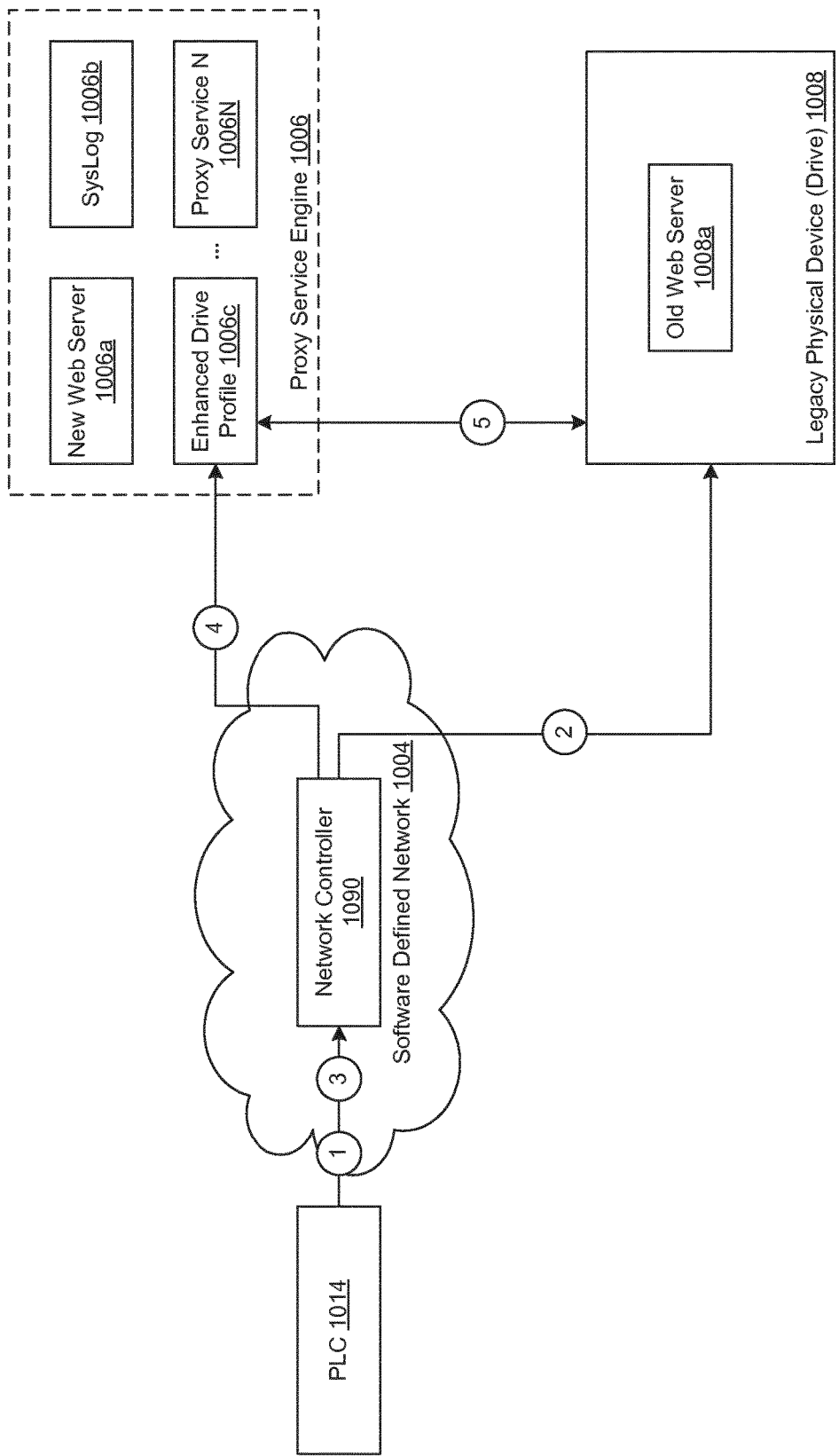
FIG. 10 is a block diagram illustrating an example of a system for enhancing services supported by a legacy device in accordance with some embodiments.

Referring to FIG. 10, a PLC 1014 is arranged for controlling a legacy motor drive 1008. The motor drive 1008 can be controlled through commands for the following supported functions RUN, STOP, and SET SPEED. Hence, the PLC 1014 may request (step 1) any of these basic supported functions from the motor drive 1008. A network controller 1090, as part of an SDN, will direct the request (step 2) to the motor drive 1008. In addition, the PLC may request enhanced functions (step 3), which are not directly supported by the motor drive 1008. Thereto, the network controller 1090 directs (step 4) the enhanced service request to a Proxy service engine 1006 which is configured to provide one or more enhanced drive profiles 1006c. The enhanced drive profile 1006c is arranged to support a particular drive profile that is built by use of the legacy motor drive 1008 supported services RUN/STOP/SET SPEED. The enhanced drive profile could be a ramp speed drive profile, such as linearly increasing or decreasing speed or non-linear increasing or decreasing speed, such as e.g. stepwise or piecewise connected curve, or it may include any other composite drive profile. The Proxy service engine 1006 facilitates the communication (step 5) between the enhanced drive profile 1006c and the motor drive 1008. Thus, the service request from the PLC is directed via the network controller 1090 to the proxy service engine 1006 to enable support of enhanced services.

Still referring to FIG. 10, the proxy service engine 1006 includes as additional proxy services a New web server 1006a, a SysLog 1006b, and a Proxy service node 1006N. The SysLog 1006b proxy service allows logging of events occurring in the proxy service engine 1006 and the motor drive 1008. The motor drive 1008a includes an old web server, which in this is example is merely capable of showing the current state of the motor drive: running, stopped, or the set speed. The new web server 1006a allows augmenting the old web server 1008a with e.g. the state of the motor drive according to the enhanced drive profile. As for example, the current instance in the drive profile, the progress of the drive profile and a trajectory of the past and future speed of the motor drive.

Example 6—Configuring SDN Devices for Directing Service Requests

Figure 11:
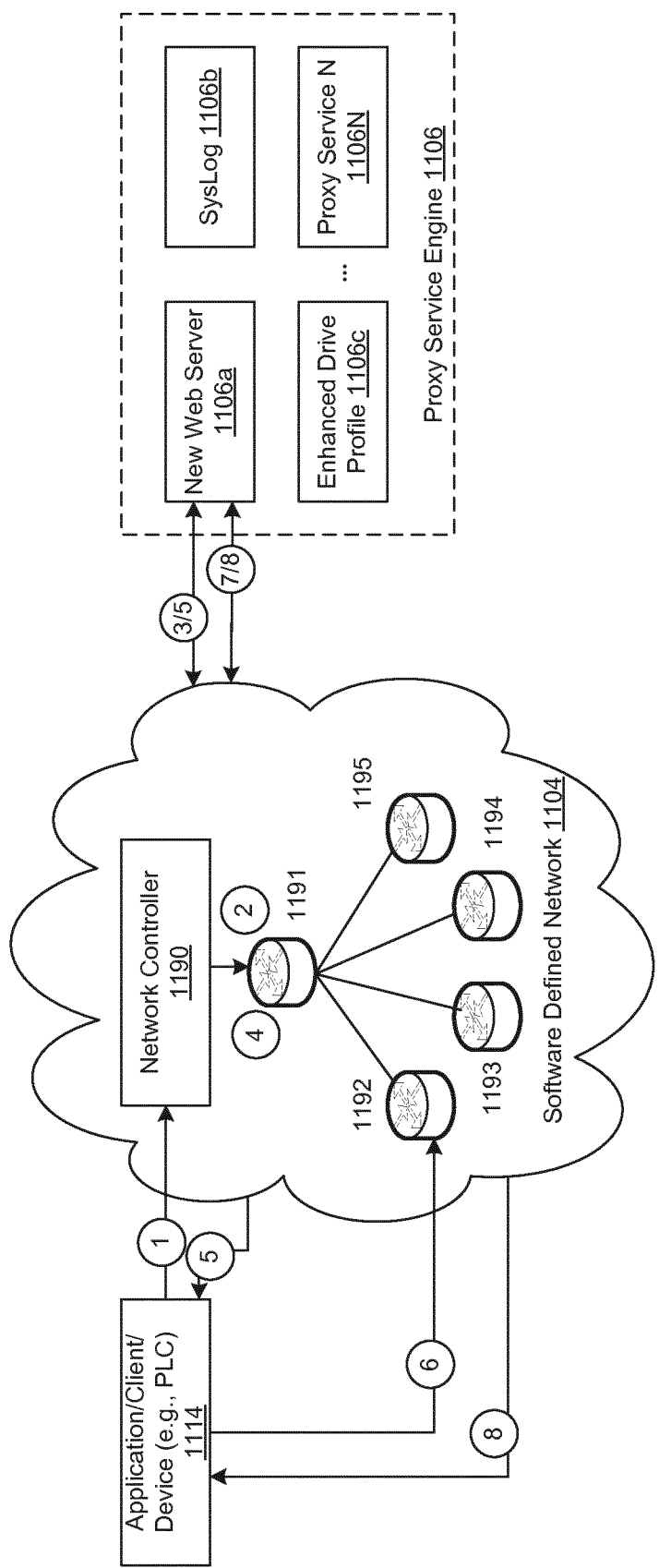
FIG. 11 is a block diagram illustrating an example of a system in which a method for configuring SDN switches for providing proxy services may be implemented.

Referring to FIG. 11, an example of a system is shown in which another example of a method for providing proxy services may be implemented. In this example, the manner in which the network controller arranges directing of service requests is elaborated in more detail. The system includes a control or interface device 1114, such as an application, client or PLC which may be arranged for controlling and/or interacting with one or more devices (not shown) similar to the example of FIG. 10. The system further includes a proxy service engine 1106 having proxy service nodes 1106a-N arranged similarly as in the example of FIG. 10. The network controller 1190 controls a number of SDN devices 1191-1195, such as switches, routers, gateways, within the Software Defined Network 1104.

In this system, a service request is initially sent to the network controller 1190. The network controller directs the request by determining the target device and routes the request to the target device, e.g. the New web server 1106a. With the target device and the routing thereto determined for a particular request, the network controller may update the rule set and configure and/or program one or more of the SDN devices for applying that rule. Accordingly, when a new request destined for the same target device is sent, the request does not need to be forwarded to the network controller, but may be forwarded by the SDN devices 1191-1195 to the target device directly. Hence, a method for implementing proxy services may include a network controller configuring SDN devices for routing service requests.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

What is claimed is:

1. A method for providing a proxy service in an industrial system, comprising:
    providing in an industrial system comprising a network including a Software Defined Network with a software defined network controller node, a proxy service engine comprising at least one proxy service node;
    the software defined network controller node intercepting communication of an incoming service request which is addressed to a target device and redirecting communication of the incoming service request to the at least one proxy service node, instead of the target device, based on a rule set, the rule set being configurable for coordinating provision of a composed service through the at least one proxy service node on behalf of the target device;
    the at least one proxy service node processing the service request, and delivering the requested service as if the requested service is being handled by the target device without having to configure or reconfigure the target device to implement or support the provision of the requested service or to implement or support one or more services or tasks associated with the provision of the requested service, wherein the at least one proxy service node handles communication on behalf of the target device, wherein the software defined network controller node intercepts incoming service requests which are being communicated across the network to a network address of the target device, and redirects communication of all of the intercepted incoming service requests to the at least one proxy service node, wherein the at least one proxy service node is configured:
to deconstruct the service request into two or more sub-requests,
to transmit at least one of the sub-requests to a physical or virtual device or service for processing, to augment functionality of the target device, and
to aggregate responses to the sub-requests into a service request response, wherein at least one of the sub-requests is transmitted to the target device.

2. The method according to claim 1, wherein the rule set comprises:
target addresses for physical automation devices, virtual automation devices and proxy service nodes; and
associations of predetermined criteria and each of the target address; and wherein the predetermined criteria include at least one of: an IP-address, a protocol type, a service request type, a source type, sub-functions of a protocol, type of optional commands, additional SNMP MIBs, alternate or augmented webpages, and/or data content.

3. The method according to claim 1, wherein redirecting the service request comprises:
determining a target address in accordance with the rule set; and
routing the service request to the determined target address.

4. The method according to claim 1, wherein processing the service request includes:
decomposing the service request;
aggregating results required for service request; and
compiling the requested service.

5. The method according to claim 4, wherein decomposing the service request comprises:
splitting the service request in one or more partial tasks to be handled by:
the proxy service node; and/or
one or more physical automation devices; and/or
one or more virtual devices.

6. The method according to claim 4, wherein decomposing the service request comprises:
identifying partial tasks listed in a service configuration set.

7. The method according to claim 6, wherein the service configuration set comprises partial tasks for:
processing communication flow; and/or
aggregating diagnostic data; and/or
responding to services request; and/or
forwarding IP-addressed communication flow to a target automation device identified by the IP-address; and/or
compiling a requested service; and/or
delivering results of a compiled service; and/or
tracking identity and/or ontology of the at least one automation device.

8. The method according to claim 1, further comprising:
the software defined network controller configuring one or more SDN devices for applying a rule set.

9. The method according to claim 1, wherein the rule set is updatable, changeable or replaceable to change services of the composed service provided for a service request directed to the target device.

10. The method according to claim 1, further comprising:
reconfiguring the rule set according to user input to update at least one task or service associated with the provision of the composed service without having the target device configured or re-configured to implement or support the at least one updated task or service.

11. The method of claim 1, wherein, in response to the service request which is addressed to the target device, the requested service delivered by the at least one proxy service node includes (1) a service from the target device and (2) at least one service which is unsupported by the target device and augments the service from the target device.

12. The method of claim 1, wherein the target device comprises at least one device for controlling or monitoring an automated process or an installation of the industrial system.

13. A proxy service provider system, comprising:
a proxy service engine comprising at least one proxy service node communicatively coupled with a software defined network controller node of a Software Defined Network (SDN);
wherein the software defined network controller node is arranged for intercepting communication of an incoming service request which is addressed to a target device and redirecting communication of the incoming service request to the at least one proxy service node, instead of the target device, based on a rule set, the rule set being configurable for coordinating provision of a composed service through the at least one proxy service node on behalf of the target device; and
wherein the at least one proxy service node is arranged for processing the service request and delivering the requested service as if the requested service is being handled by the target device without having to configure or reconfigure the target device to implement or support the provision of the requested service or to implement or support one or more services or tasks associated with the provision of the requested service,
wherein the at least one proxy service node handles communication on behalf of the target device,
wherein the software defined network controller node intercepts incoming service requests which are being communicated across the network to a network address of the target device, and redirects communication of all of the intercepted incoming service requests to the at least one proxy service node,
wherein the at least one proxy service node is configured:
to deconstruct the service request into two or more sub-requests,
to transmit at least one of the sub-requests to a physical or virtual device or service for processing, to augment functionality of the target device, and
to aggregate responses to the sub-requests into a service request response,
wherein at least one of the sub-requests is transmitted to the target device.

14. The system according to claim 13, wherein the software defined network controller node is arranged for configuring one or more SDN devices for applying the rule set.

15. The system according to claim 13, wherein the proxy service engine resides in a virtualization environment running on distributed compute nodes.

16. The system according to claim 13, wherein the proxy service engine resides in an industrial device.

17. The system according to claim 13, wherein the rule set is dynamically determined prior to the applying.

18. A method for augmenting functionality of an industrial device, comprising:
    receiving by a proxy service node of a proxy service engine a service request transmitted across a network from a client, wherein communication of the service request, which is addressed to a target industrial device, is intercepted and redirected based on a rule set to the proxy service node, instead of the target industrial device, by a software defined network controller or one or more network devices programmed by the software defined network controller, the rule set being configurable for coordinating provision of a composed service through the proxy service node or one or more network devices programmed by the software defined network controller on behalf of the target industrial device;
    deconstructing the service request into two or more sub-requests;
    transmitting at least one of the sub-requests to a physical or virtual device or service for processing, to augment functionality of the target industrial device;
    aggregating responses to the sub-requests into a service request response; and
    providing the service request response to the client as if the service request response is being handled by the target industrial device without having to configure or reconfigure the target industrial device to implement or support the provision of the requested service or to implement or support one or more services or tasks associated with the provision of the requested service,
    wherein the proxy service node handles communication on behalf of the target industrial device,
    wherein the software defined network controller or one or more network devices programmed by the software defined network controller intercepts incoming service requests which are being communicated across the network to a network address of the target industrial device, and redirects communication of all of the intercepted incoming service requests to the at least one proxy service node,
    wherein at least one of the sub-requests is transmitted to the target industrial device.

19. The method of claim 18, wherein the proxy service node of the proxy service engine resides in a virtualization environment hosted by compute nodes.

20. The method of claim 18, wherein the service request is deconstructed based on identification of the sub-requests.

21. The method of claim 18, wherein at least one of the sub-requests is transmitted to a cloud-based web-service.

22. The method of claim 14, wherein the rule set comprises:
    target addresses for physical automation devices, virtual automation devices and proxy service nodes; and
    associations of predetermined criteria and each of the target address; and
    wherein the predetermined criteria include at least one of: an IP-address, a protocol type, a service request type, a source type, sub-functions of a protocol, type of optional commands, additional SNMP MIBs, alternate or augmented webpages, and/or data content.

23. The method of claim 18, wherein one of the two or more sub-requests is transmitted to the physical or virtual device for processing, and another of the two or more sub-requests is transmitted to the service for processing, the physical or virtual device comprising a meter or a virtual device associated with the meter and the service comprising a web service.

24. The method of claim 23, wherein the web service comprises a forecast or prediction service.

* * * * *